United States Patent

Fujimori et al.

[11] Patent Number: 5,870,988
[45] Date of Patent: Feb. 16, 1999

[54] MULTI-CYLINDER ENGINE INTAKE MANIFOLD, INTAKE CONTROL UNIT USING THAT INTAKE MANIFOLD AND MANUFACTURING METHOD

[75] Inventors: Makoto Fujimori; Isamu Suzuki; Yasuyuki Akasaka, all of Obu, Japan

[73] Assignee: Aisan Industry Co., Ltd, Obu, Japan

[21] Appl. No.: 907,090

[22] Filed: Aug. 6, 1997

[30] Foreign Application Priority Data

Sep. 13, 1996 [JP] Japan ................................ 8-242848

[51] Int. Cl.⁶ .................................................. F02M 35/10
[52] U.S. Cl. .................. 123/184.55; 123/184.61
[58] Field of Search ......................... 123/184.55, 184.61

[56] References Cited

U.S. PATENT DOCUMENTS

| | | | |
|---|---|---|---|
| 2,835,235 | 5/1958 | Gassmann | 123/184.55 |
| 4,590,895 | 5/1986 | Yada et al. | 123/393 |
| 4,592,310 | 6/1986 | Hitomi et al. | 123/184.55 |
| 4,619,226 | 10/1986 | Ueda et al. | 123/432 |
| 4,646,689 | 3/1987 | Katsumoto et al. | 123/184.55 |
| 4,765,286 | 8/1988 | Lyjak et al. | 123/184.55 |
| 5,156,117 | 10/1992 | Müller et al. | 123/184.31 |
| 5,438,964 | 8/1995 | Breidenbach | 123/184.55 |
| 5,492,088 | 2/1996 | Ohnberger | 123/184.55 |
| 5,575,249 | 11/1996 | Mielke et al. | 123/184.61 |

FOREIGN PATENT DOCUMENTS

| | | | |
|---|---|---|---|
| 0123139 | 10/1984 | European Pat. Off. | 123/184.55 |
| A-747584 | 12/1996 | European Pat. Off. | |
| A-59-188027 | 10/1984 | Japan . | |
| A-60-19914 | 2/1985 | Japan . | |
| A-60-138223 | 7/1985 | Japan . | |
| A-60-142013 | 7/1985 | Japan . | |
| 60-147529 | 8/1985 | Japan | 123/184.55 |
| A-60-216028 | 10/1985 | Japan . | |
| A-60-216029 | 10/1985 | Japan . | |
| A-60-216064 | 10/1985 | Japan . | |
| 60-224922 | 11/1985 | Japan | 123/184.55 |
| A-60-224922 | 11/1985 | Japan . | |
| 2239899 | 7/1991 | United Kingdom | 123/184.55 |

*Primary Examiner*—David A. Okonsky
*Attorney, Agent, or Firm*—Oliff & Berridge, PLC

[57] ABSTRACT

An intake manifold is manufactured by assembling resin-molded parts without using any cores, so that compactness, light-weight, low-cost and improvement of engine performance can be achieved. A inner pipe is fit-inserted into a cylindrical tubular part of an outer pipe, thereby a outer pipe support is fixed on. By fitted parts, a positioning of a direction of circumference of the outer pipe and the inner pipe is performed. The air from a inlet flows into a sarge tank through a throttle valve. Afterward, the air flows from a manifold passage inlet to a manifold passage so as to lead to intake ports of engine cylinders by passing from a straight passage through an outlet.

11 Claims, 9 Drawing Sheets

MULTI-CYLINDER ENGINE INTAKE MANIFOLD, INTAKE CONTROL UNIT USING THAT INTAKE MANIFOLD AND MANUFACTURING METHOD

BACKGROUND OF THE INVENTION

1. Field of the Invention

The present invention relates to internal combustion engines and particularly to an intake manifold for multi-cylinder engines, an intake control unit utilizing the intake manifold and an intake manifold manufacturing method.

2. Description of Related Art

Utilizing the so-called intake inertia effect is an effective technique for improving performance in automotive internal combustion engines by increasing the air intake efficiency. However when the cross sectional area of the intake passage is fixed, the length of the intake passage at which maximum effect is delivered, becomes shorter as engine speed increases.

A method is publicly known in the conventional art in Japanese Laid Open Patent 60-216064 proposing cylindrical rotary valves operating according to engine speed and an intake control unit to distribute the required air for combustion in spiral intake passages in the same number of engine cylinders and enclosing the periphery of the rotary valves.

This intake control unit has a cylindrical casing mounted coaxially with the rotary valve at the periphery of the rotary valve. At the upper part of the casing, branch pipes equal in number to the engine cylinders are provided. These branch pipes are fixed on the cylinder head and connected with the intake port of the engine cylinder. As a result of this, an air intake system is constructed such as the air flows into each engine cylinder through the rotary valves and the spiral intake passages.

However, in the technology of the related art, the cylindrical casing provided on the periphery of the rotary valve and the plurality of branch pipes diverging from the casing were integrated with as a piece of intake manifold. Also, since each branch pipe provided a spiral intake passage enclosing the periphery of the rotary valve, core melting molding was utilized for producing the casing and the branch pipe into one piece. Especially, in order to achieve a light-weight of vehicle, it has been required that the above-mentioned parts are to be resinification.

However, the core melting molding needed for manufacturing the case and branch pipes (in other words, the intake manifold) had the drawback of requiring core production or troublesome melting processes after molding of the core. Therefore, it resulted in the disadvantage that the manufacturing process was not convenient.

In addition, another problem was that the intake inertia effect was unsatisfactory since air leaks occurred from the gap needed for rotary valve rotation.

SUMMARY OF THE INVENTION

An object of the invention is to overcome problems described above and to provide an intake manifold for multi-cylinder engines, an intake control unit utilizing the intake manifold and an intake manifold production method that resolves the above mentioned problems.

Additional objects and advantages of the invention are set forth in the description which follows, are obvious from the description, or may be learned by practicing the invention. The objects and advantages of the invention may be realized and attained by the apparatus recited in the claims.

To achieve the objects and in accordance with the purpose of the invention, an intake manifold comprises an outer pipe, an inner pipe fit-inserted into the outer pipe and having a surge tank inside, a plurality of rim-shaped passage walls at interval in an axial direction of a periphery of the inner pipe, a plurality of spiral manifold passages allocated by each rim-shaped passage wall on the outer pipe and inner pipe, a plurality of manifold inlets formed at intervals in the axial direction of a wall surface of the inner pipe for delivering air from the surge tank into the manifold passages, and a plurality of manifold outlets formed at intervals in the axial direction of the wall surface of the outer pipe for supplying the air from each of the manifold passages to each intake port of a multicylinder engine.

Also, in another aspect of the present invention, the intake manifold comprises an outer pipe, an inner pipe fit-inserted into the outer pipe and having a surge tank inside, a plurality of rim-shaped passage walls at interval in an axial direction of a periphery of the inner pipe, a plurality of spiral manifold passages allocated by each rim-shaped passage wall on the outer pipe and inner pipe, a plurality of first manifold inlets formed at intervals in the axial direction of a wall surface of the inner pipe for delivering air from the surge tank into the manifold passages, a plurality of second manifold inlets formed at intervals in the axial direction of the wall surface of the inner pipe for letting air from the surge tank into each of the manifold passages and also positioned farther downstream in the air flow from the manifold passage than the first manifold inlets, a plurality of manifold outlets formed at intervals in the axial direction of the wall surface of the outer pipe for supplying the air from each of the manifold passages to each of the intake ports of a multicylinder engine, and a rotary valve provided with the inner circumferential surface of the inner pipe which comprises a first connecting hole for leading the air inside the surge tank into the first manifold passage through the first manifold inlets at a low-speed rotation, a second connecting hole for leading the air inside the surge tank into said manifold passage through the second manifold inlets.

Also, in another aspect of the present invention, the intake manifold comprised an outer pipe having a cylindrical tubular part and a plurality of manifold outlets provided in parallel at intervals in an axial direction of the tubular part, an inner pipe having a tubular part provided inside the outer pipe, and a plurality of rim-shaped passage walls formed in parallel at intervals in the axial direction on a periphery of the tubular, manifold passage formed at a space which is partitioned between each passage wall and the periphery of the outer pipe so as to connect with each manifold passage outlets by the inserting of the inner pipe into said outer pipe, cutoff wall provided on the periphery of the inner pipe for connecting with an upper internal wall surface of the manifold outlet, and manifold inlet, which is close to the cutoff wall and provided with the tubular part for an upstream side of the manifold outlet, for connecting with each manifold passage.

An intake control unit of the present invention comprises manifold passages in the same numbers of engine cylinders provided around the outside of a tubular part of inner pipe, manifold inlet and second manifold inlet on each manifold passage for opening to the inner pipe, rotary valve for rotating by inserted into the inner pipe and for selectively connecting with said manifold passage, and sealing means for sealing a gap between the periphery and the inner circumference by touching the peripheral side of the rotary valve and a part of the inner circumference of the tubular part of the inner pipe at a short distance alongside of the manifold passage inlet and second manifold inlet of the inner pipe.

A manufacturing method of the present invention for inner pipe of an intake manifold provides a method that in order to mold a curved shape on the side of manifold moldings by putting a peripheral edge of passage wall of inner pipe into the inside of the outer pipe, the curved part of the peripheral edge of passage wall for a single piece of inner pipe is molded and pressed by a metal mold which is molded as a predetermined shape and heated by a heater.

The intake manifold, intake control unit and manufacturing method of this invention are constructed as described above. Therefore, in the process of producing the main parts like the outer pipe and inner pipe for composing the intake manifold, the resinification, light-weight and low-cost can be achieved without using the core melting molding.

Further, the manifold passage is a nearly circular shape around the inner tube shape and provided in the same number of cylinders. As a result of this, while the whole size can be small and compact, the passage length can be also obtained longer. At the high-speed rotation, the passage length can be shortened sharply. Also, by applying to the intake internal effect, the engine output can be improved over the wide range of engine speed.

In addition, the compactness of the intake manifold can be achieved, and a surface area can be diminished because the surface of the outer pipe is a main exposed outside. Also, since the outer pipe and inner pipe is not integrated each other, thermal conduction from the outer pipe to the inner pipe can be suppressed. The realization of resinification may augment the adiabatic efficiency so as to lower the intake temperature. As viewed from this point, the engine output can be improved. Further, a fine gap between the outer pipe and the inner pipe may prevent the thermal conduction or noise from effecting on the outside.

To summarize the above, compactness, light-weight and low-cost can be achieved, and the engine output can be also improved.

Another benefit is that the same main parts can be shared in the intake manifold without using the rotary valve, and in the intake manifolds with using the rotary valves by applying to the intake inertia effect.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention.

In the drawings,

FIG. 3 is an enlarged detailed view of an essential portion of the embodiment of FIG. 1.

FIG. 4 is two drawings showing an essential changed portion of the embodiment in FIGS. 1 through FIG. 3.

FIG. (5) is a descriptive view of the production method for the inner pipe shown in FIG. 4(a).

FIG. 6 is two drawings of another embodiment of the invention.

DETAILED DESCRIPTION OF THE PREFERRED EMBODIMENTS

A detailed description embodied by the present invention is provided below with reference to the accompanying drawings.

[First Embodiment]

Figure 1A:
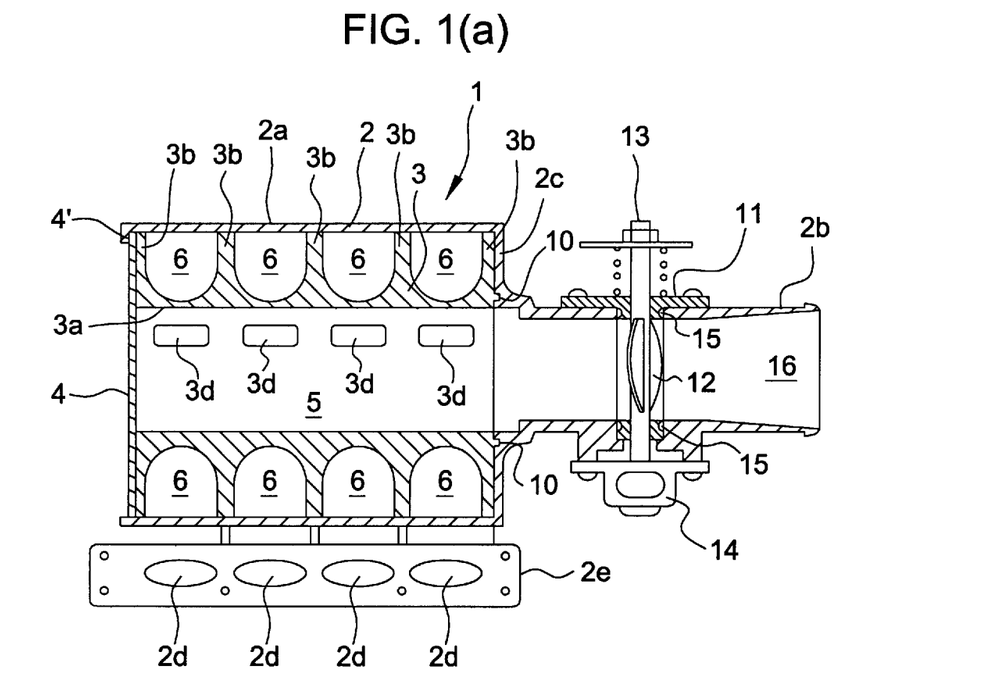
FIG. 1(a) is a vertical cross sectional view and FIG. 1(b) is a horizontal cross sectional view in the embodiment of this invention taken along the cross section II—II in FIG. 2.
Figure 1B:
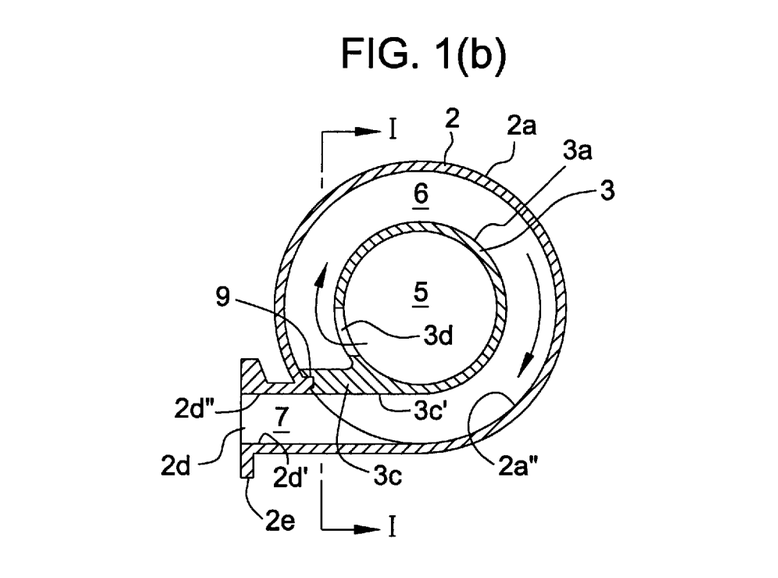
Figure 2:
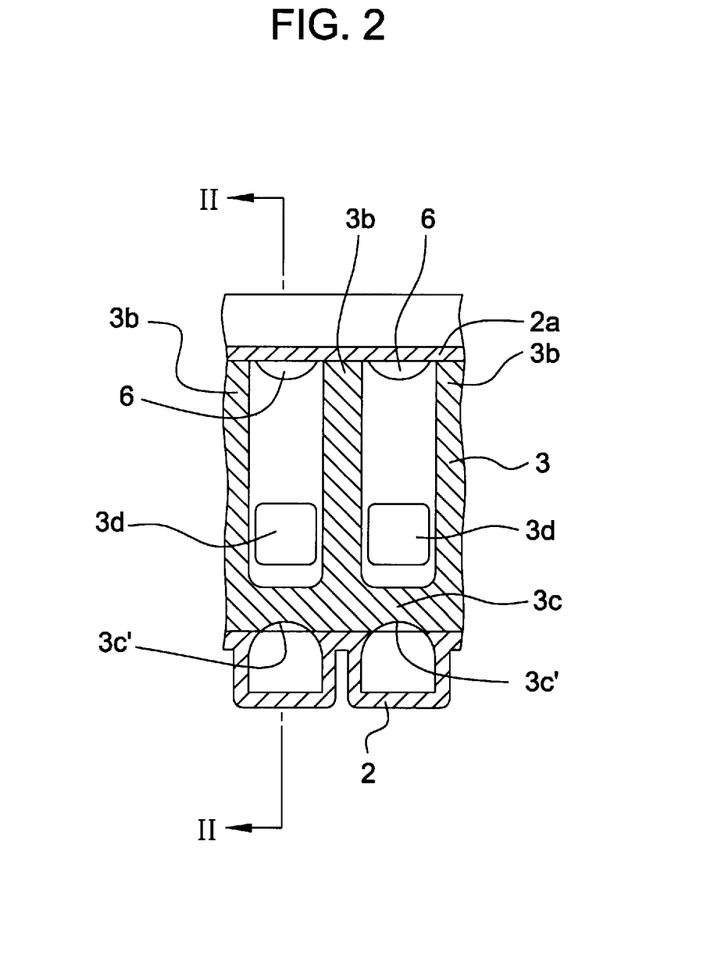
FIG. 2 is a cross sectional perspective view along the cross section I—I of FIG. 1b.
Figure 3A:
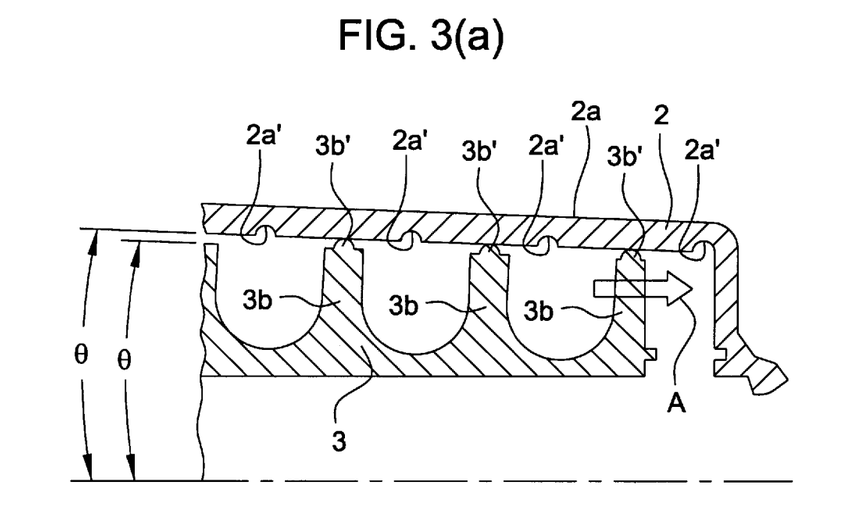
FIG. 3(a) is a view prior to assembly and FIG. 3b is a view after assembly.
Figure 3B:
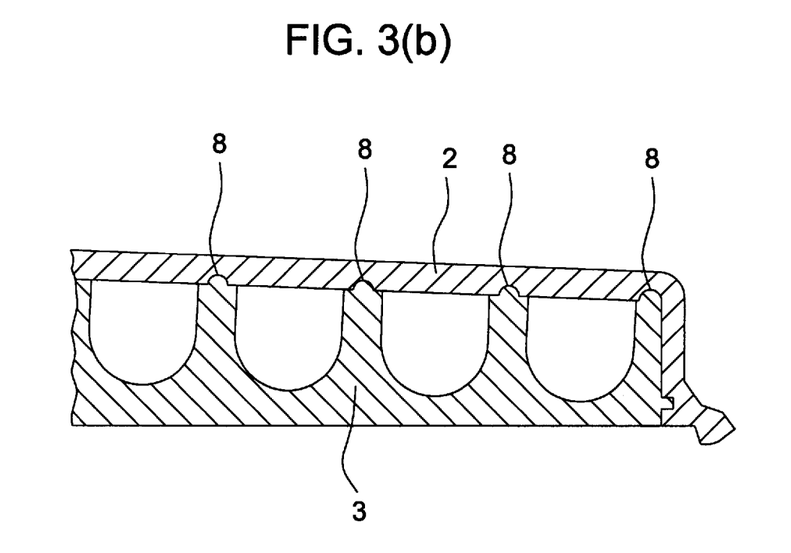

In FIG. 1(a), FIG. 1(b), in FIG. 2, FIG. 3(a) and FIG. 3(b), the reference numeral 1 denotes an intake manifold. A synthetic resin inner pipe 3 is inserted and fitted into a resin outer pipe 3. A disc-shaped outer pipe cover 4 at the left edge of the drawing is fixed on. The periphery of the pipe cover 4 is welded and sealed to the outer pipe 2. The reference numeral 4' denotes a sealing part.

The outer pipe 2 is integrated with a cylindrical tubular part 2a with large diameters and a cylinder part 2b with small diameters through a step 2c. Reference numeral 2d is a manifold passage outlet formed in the tubular part 2a. Four outlets are provided for a four cylinder engine at predetermined intervals in an axial direction. A flange 2e is integrated with the outer pipe 2 for connecting the manifold passage outlet 2d to each engine port of engine cylinder (not illustrated in the figure).

As shown in FIG. 1(b), a partialness of internal wall surface of branch pipe which forms the manifold passage outlet 2d is formed by a tangent line 2d' of an inner circumference 2a" of the cylindrical tubular part 2a. These branch pipes are therefore shown as straight pipes towards the left and right in FIG. 1b.

In the inner pipe 3, a cylindrical tubular part 3a and five rim-shaped passage walls are integrately resin-molded on the periphery of the cylindrical tubular part 3a at the predetermined interval in the axial direction. Also, with inserting the inner pipe 3 into the tubular part 2a of the outer pipe 2, a cutoff wall 3c for connecting with an upper inner wall 2d" is provided as shown in FIG. 1(b). In FIG. 1(b), a wall 3c' of the cutoff wall 3c is denoted by straight lines of the left-right direction, and this line connects with a tangent line of peripheral radius of the tubular part 3a. A manifold passage inlet 3d is provided just on the upper part of the cutoff wall 3c at the tubular part 3a of the inner pipe 3 as shown FIG. 1(b). The air in a surge tank 5 formed inside the tubular part 3a is allowed to flow respectively through the tubular part 2a of outer pipe 2 and the four manifold passages 6 allocated by a passage walls 3b and the tubular part 3a of the inner pipe 3.

The manifold passage 6 is circularly formed so as to making a circuit on the periphery of the tubular part 3a of the inner pipe 3 as shown in the cross section of FIG. 1(b). In the preferred embodiment of the present invention, the manifold passage 6 is formed at an angle of circumference, approximately 315 degree. The downstream is connected with a straight-line passage 7 for leading to the manifold outlet 2d.

The tubular part 2a of the outer pipe 2 has an angle denoted by the θ symbol in the enlarged drawing in FIG. 3a. The passage wall 3b of the inner pipe 3 has approximately the same angle as the outer pipe 2 allowing easy insertion for assembly of the intake manifold 1.

Five ring-shaped slots 2a' are carved in the inner circumference of the cylindrical tubular part 2a, and ring-shaped protrusions 3b' are formed on the periphery of the passage walls 3b corresponding to the slots 2a'. Therefore, when the inner pipe 3 is inserted into the outer pipe 2 as shown by the arrow A in FIG. 3a, the protrusions 3b' is fit into each corresponding slot 2a' and stick each other by a snap action to maintain tightness sealing inside both tubular parts, and to prevent leakage among the manifold passages 6 which connect to each engine cylinder.

As a result of this structure, under the condition that the protrusions 3b' is fitted into the slots 2a'as shown in FIG. 3(b), a combination 8 of fitted parts of the slot 2a and the protrusion 3b not only enables to maintains tightness seal between the inner pipe 3 and the outer pipe 2 but also enables to perform a positioning the axial direction between the inner pipe 3 and the outer pipe 2.

As shown in FIG. 1(b), a fitted part 9 composed by a protrusion which protrudes in the inner circumference of the tubular part 2a of the outer pipe 2 and extends perpendicularly in the axial direction, and a slot formed on the cutoff wall 3c for fitting the protrusion (the slot extends perpendicularly in the axial direction), performs a positioning of the direction of circumference of the inner pipe 3 opposed to the outer pipe 2.

The fitted part of slots and protrusions for sealing and for positioning the axial direction or the direction of circumference of the outer pipe 2 and inner pipe 3 may be provided in the necessary positions, necessary quantities and appropriate shapes.

This arrangement allows the upper part of the interior wall surface 2d of the branch pipe that forms the manifold outlet 2d and a wall surface 3c' of the cutoff wall 3c to together form one straight surface as shown in FIG. 1. Therefore, the intake air is allowed to flow smoothly without any resistance.

In addition, the combination 8 for positioning in the axial direction can prevent the intake air resistance from occurring.

Further, in this embodiment, an intermesh 10, 10 have been added to fit the slot formed on the step 2c of the outer pipe 2 with the protrusion formed in the right surface of the inner pipe 3 as shown in FIG. 1a in order to perform circumferential positioning for the outer pipe 2 and the inner pipe 3.

A throttle body 11, which is inserted and fixed into the cylinder part 2b with small diameter of the outer pipe 2, is pivoted so that a throttle shaft 13 provided with a throttle valve 12 can be rotated. A throttle sensor 14 detects the amount of throttle opening and converts the detected amount into an electrical signal. An tightness seal 15 is provided between the outer pipe 2 and the throttle body 11.

Air from the air inlet 16 flows through the throttle valve 12 and enters the surge tank 5. The air passes through each manifold inlet 3d, enters the corresponding manifold passage 6 so that the air goes surrounding of the circumference of the tubular part 3a for approximately one turn of the angle of circumference as shown in FIG. 1(b). Then, the air is led to flow from the manifold passage outlet 2d into the intake port of each engine cylinder (not illustrated).

[Second Embodiment]

Figure 4A:
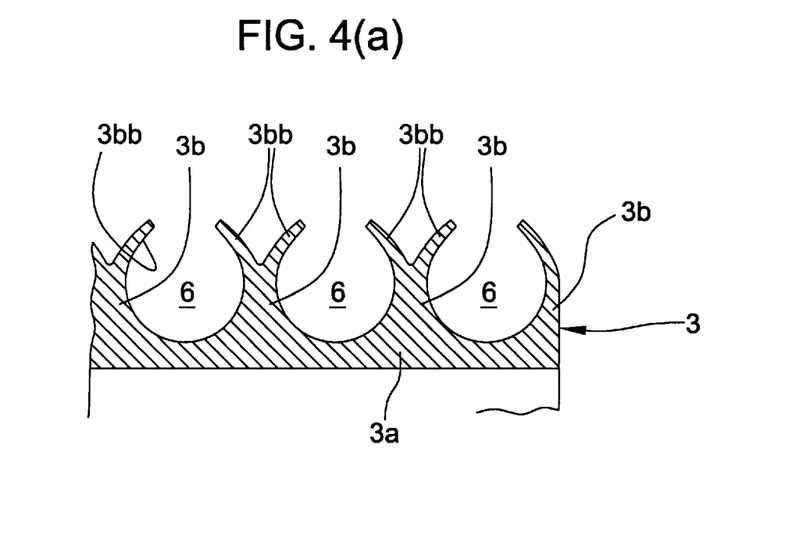
FIG. 4(a) shows an enlarged vertical cross sectional view of a portion of the inner pipe.
Figure 4B:
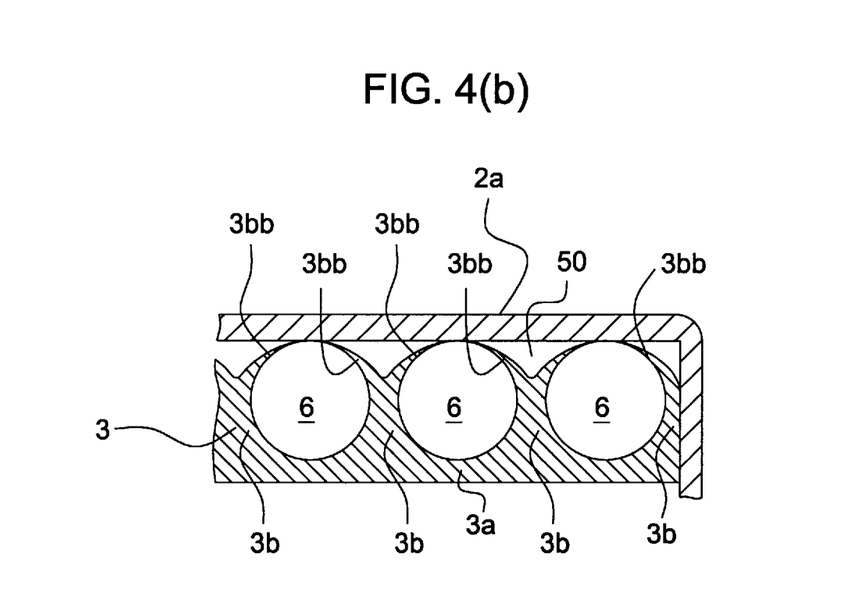
FIG. 4(b) is an enlarged vertical cross sectional view showing a portion of the inner pipe inserted into the outer pipe.
Figure 5:
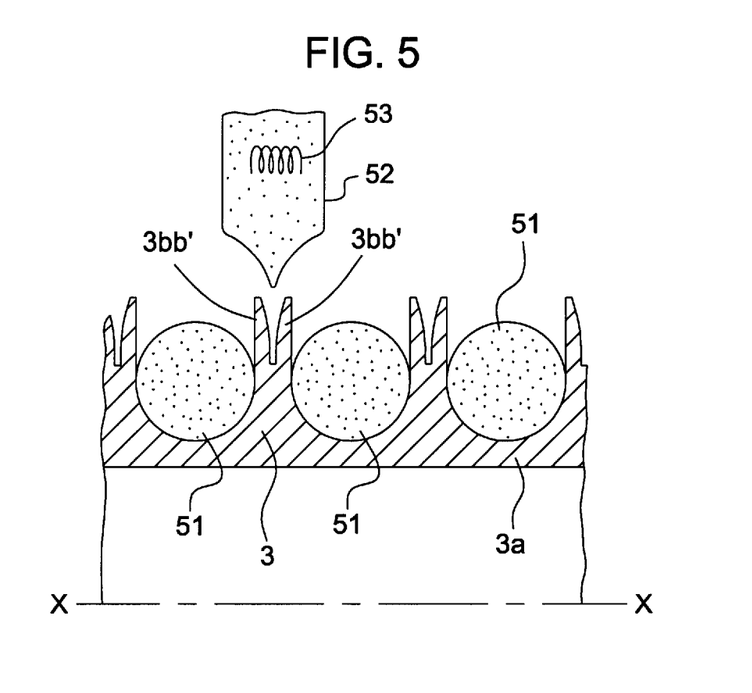

The second embodiment shown in FIG. 4(a), 4(b) and FIG. 5 is partially transformed from the first embodiment.

FIG. 4(a) shows an inner pipe 3 having respectively curved branch pipes 3bb on the manifold passage 6 side of the outer circumference of the rim-shaped passage wall 3b. FIG. 4(b) shows the inner pipe 3 (of FIG. 4a) inserted inside the tubular part 2a of the outer pipe 2.

The manifold passage 6 has a nearly circular cross section with few sharp angles due to the curve of the branch wall 3bb. The curve of the branch wall 3bb causes to a gap 50 between the branch walls 3bb of the manifold passage 6.

In this embodiment, as a result that the cross section of the manifold passage 6 has few sharp angles, it is effective that the intake air flow loss is reduced and the engine output further improved.

Further, it is also effective that the gap 50 may keep noise form transferring inside, and may prevent heat propagation from the external surface to the internal sections.

FIG. 5 shows the method for forming the branch wall 3bb of inner pipe 3 show in FIG. 4(a).

The branch wall 3bb in FIG. 4(a), which is a state before it is formed like the branch wall 3bb' in FIG. 5, is a shape that the branch wall is separated from the rim-shaped passage wall and it extends in a roughly radial direction. The diameter of the periphery of the branch wall at this time is greater than the inner diameter of the outer pipe 2 in FIG. 4(b).

In order to curve the branch wall 3bb' (in FIG. 5)to change the branch wall 3bb' shown in FIG. 4a, a metal molding 52 with a desired curve is heated by a heater 53 and then pressed against the branch wall 3bb to machine as a desired shape. Line X—X in FIG. 5 is a axial line of the inner pipe 3.

Using a specified bearing tool 51 (the tool 51 may be possible to include a heating function) may be more effective.

[Third Embodiment]

Figure 6A:
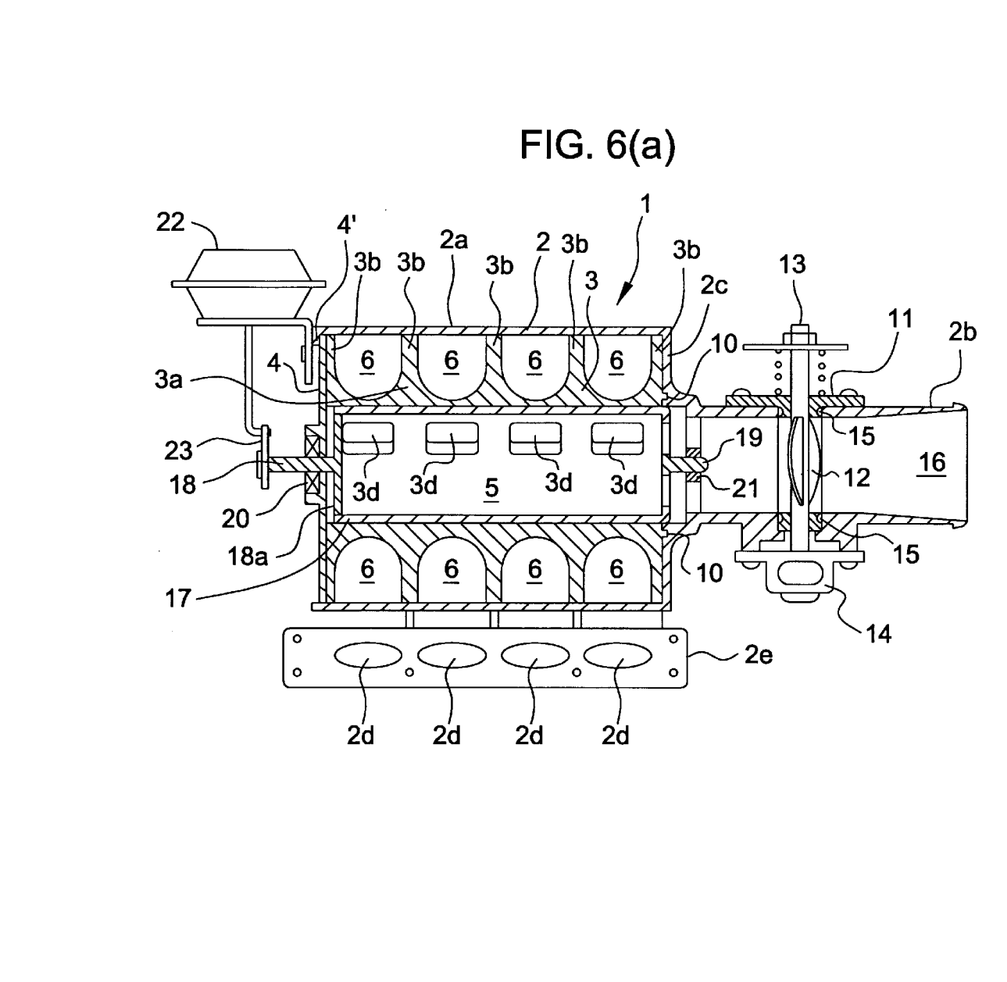
FIG. 6(a) is a vertical cross sectional view and FIG. 6(b) is a horizontal cross sectional view taken along the cross section IV—IV in FIG. 7.
Figure 6B:
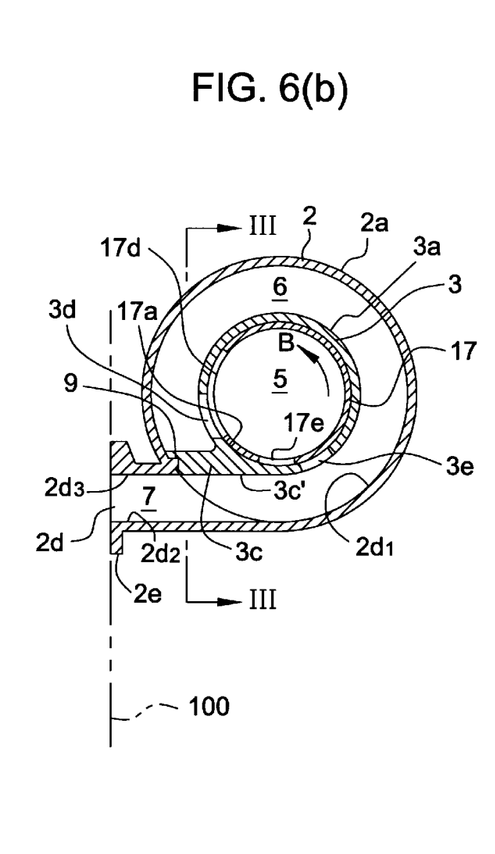
Figure 7:
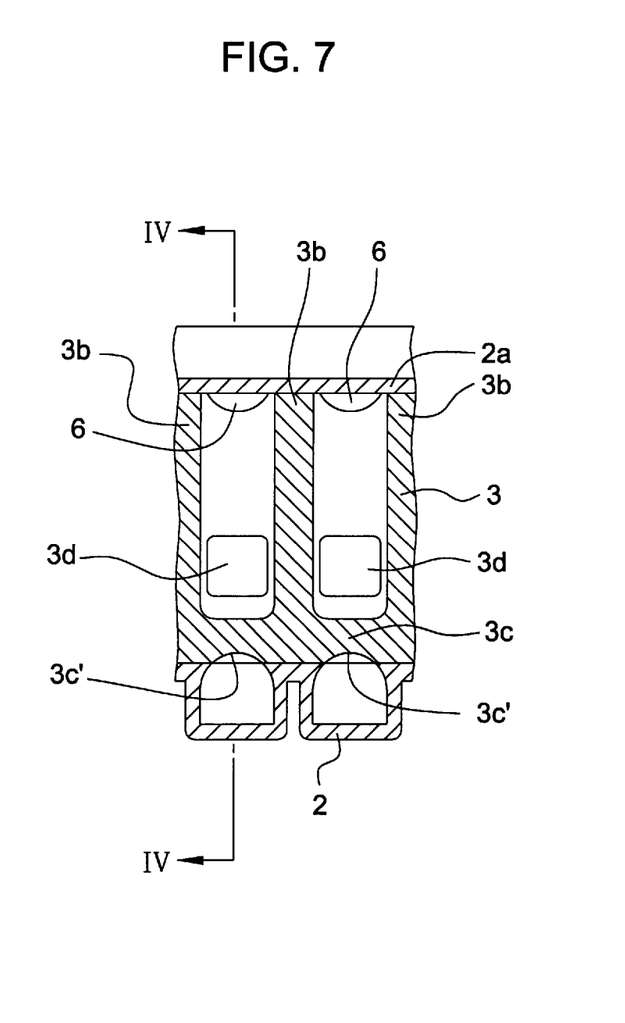
FIG. 7 is a perspective view taken along the cross section III—III in FIG. 6b.

The third embodiment shown in FIG. 6(a), FIG. 6(b) and FIG. 7 is an intake control unit installed with rotary valve to apply the intake internal effect of the intake manifold 1 of the first embodiment.

The parts and functions comprising this embodiment are identical to the intake manifold 1 of the first embodiment so the same reference numbers are used and a description is omitted.

In the third embodiment, a second manifold inlet 3e is provided with the inner pipe 3. As shown in FIG. 6(b), the second manifold inlet 3e is disposed between the cutoff wall 3c of the tubular part 3a of the inner pipe 3 and the manifold inlet 3d.

A cylindrical rotary valve 17 is inserted and fixed inside the cylindrical tubular part 3a of the inner pipe 3 with the slight gap. Shafts 18 and 19 for the rotary valve 17 provides bearings 20 and 21 for rotation.

The shaft 18 is integrated with the center of a disc 18a, which is fixed on the left internal circumference of the rotary valve 17 as shown in FIG. 6(a). Also, the shaft is supported by the bearing 20 of the outer pipe cover 4.

The shaft 19 is provided with tree arms of the radius direction of the rotary valve 17 as shown in the right side of the FIG. 6(a), and it is supported by the bearing 21 of the outer pipe 3. The bearing 21 is resin-molded integrately with the outer pipe 3 and the tree arms which are integrated and extends in the radius direction.

A diaphragm actuator 22 is operated by exhaust gas pressure from the engine not shown in the drawing and operates the rotary valve 17 by means of a lever 23.

As shown in FIG. 6(b), the rotary valve 17 has a first connecting hole 17d for connecting with the manifold inlet 3d at the low-speed rotation, also has a second connecting hole 17e for connecting with the manifold inlet 3e at the high-speed rotation (when the rotary valve 17 is rotated in an allow B direction, or in other words counterclockwise). Both the connecting holes 17*d* and 17*e* are provided for the same numbers and positions of the manifold passages 6.

Consequently, at the low-speed rotation, the connecting hole 17*d* of the rotary valve 17 is at the position shown in FIG. 6(*b*). The air in the surge tank 5 enters into the manifold passage 6 passed through the first connecting hole 17*d* and the manifold inlet 3*d*. The air goes around the circumference of the tubular part 3*a* of the inner 3, and passes through the straight passage 7 so as to enter into each cylinder intake port of the engine 100 (not illustrated) from the manifold passage outlet 2*d*. The actual path of air flowing through the manifold passage 6 at this time is longer, amounting to roughly one turn around the cylindrical tubular 3*a*.

At the high-speed engine, the diaphragm actuator 22 rotates the rotary valve 17 in the counterclockwise direction like an arrow B as shown in FIG. 6(*b*). Therefore, the air in the surge tank 5 flows from the second connecting hole 17*e* to the manifold passage 6 through the second manifold inlet 3*e* and immediately flows through the straight passage 7 to flow into the cylinder intake port of the engine 100 (not shown in the drawing )from the manifold outlet 2*d*. The actual path of air flowing through the manifold passage 6 at this time is extremely shorter.

The engine output is thus improved by applying the intake internal effect.

In the third embodiment of FIG. 6(*b*), although two separated connecting holes 17*d* and 17*e* per engine cylinder are provided circumferentially in the rotary valve, by eliminating the wall of a tubular part 17*a* between both connecting holes, one large connecting hole may result in the same effect as the third embodiment.

Incidentally, at the low-speed rotation, the second connecting hole 17*e* is not connected with the second manifold inlet 3*e*. However, since they are located in close proximity as shown in FIG. 6(*b*), also a gap exists between the inner circumference of the tubular part 3*a* and the periphery of the rotary valve 17, at low-speed rotation, the air flows from the second connecting hole 17*e* through this gap to the second manifold inlet 3*e*. Therefore, this may cause a problem that at the low-speed rotation, the length of the intake passage becomes shorter and the engine output torque declines.

At the high-speed rotation that the actual air intake path is short, there are no adverse influences on the intake inertia effect even when air leaks from this gap. However, at the low-speed rotation that the air intake path is long, air leakage from this gap will reduce the intake inertia effect.

In order to resolve these problems the following fourth embodiment of this invention was achieved.

[Fourth Embodiment]

Figure 8:
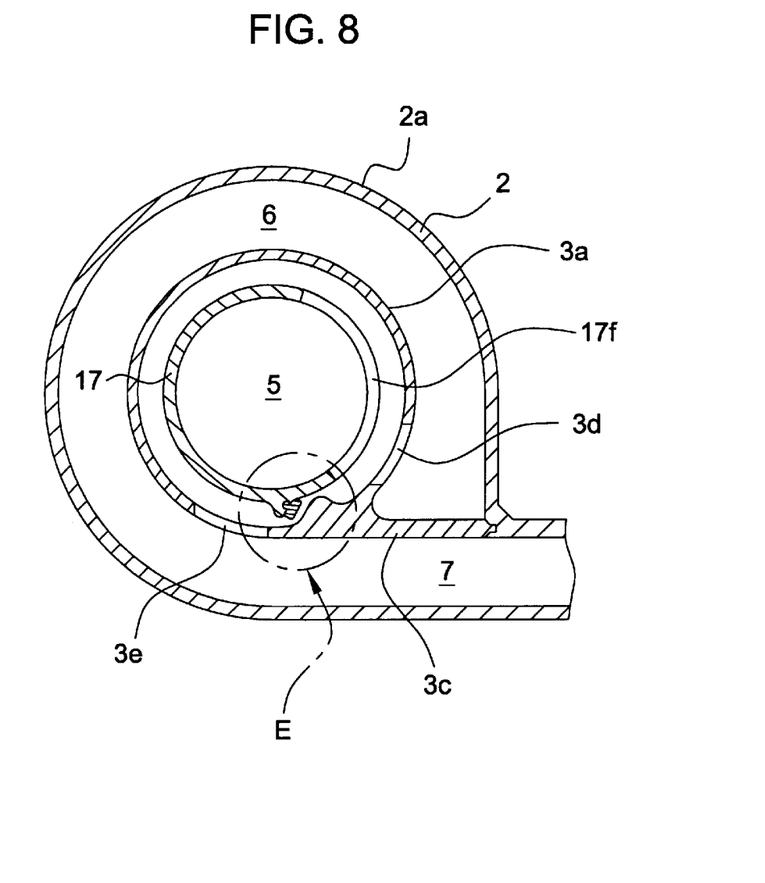
FIG. 8 is a horizontal cross sectional view of an essential portion of still another embodiment of the invention.
Figure 9:
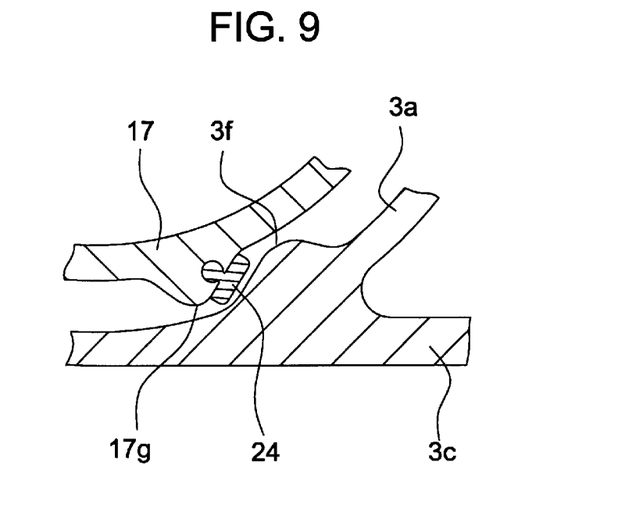
FIG. 9 is an enlarged view of section E in FIG. 8.
Figure 10:
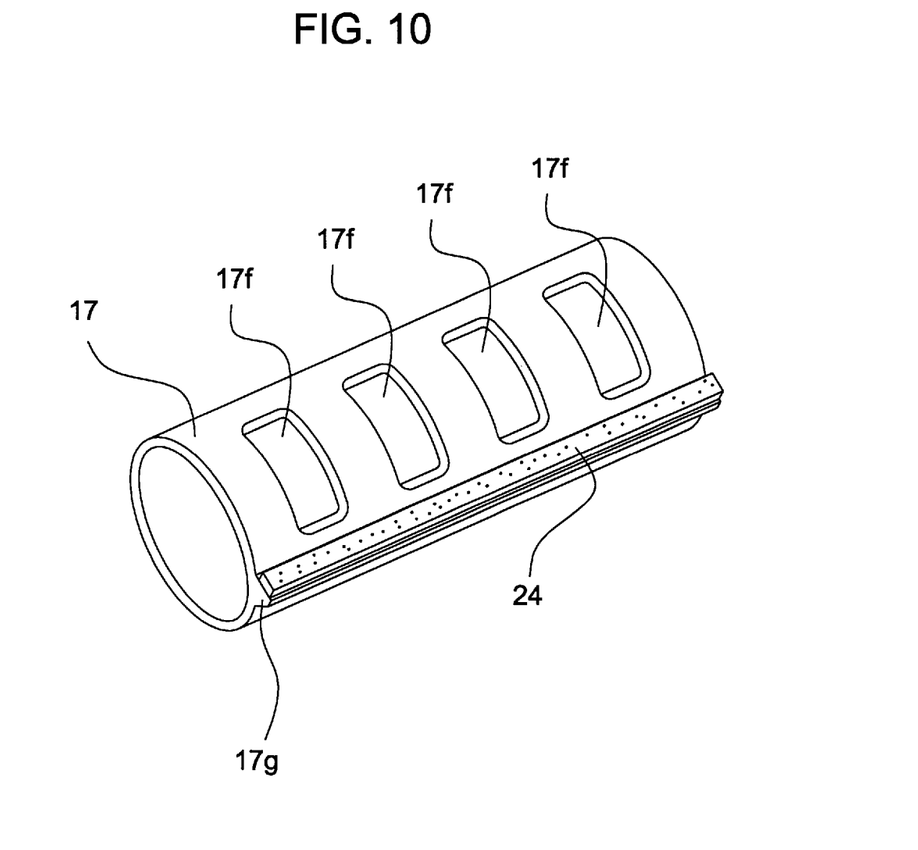
FIG. 10 is a perspective view of the rotary valve used in the embodiment of FIG. 8 and FIG. 9.

As shown in FIGS. 8 through FIG. 10 for this embodiment, a protrusion 3*f*, which is protruded inside the tubular part 3*a* from the cutoff wall 3*c* in the inner pipe 3 and extends in the axial direction of the inner pipe 3, is formed. Also, a second protrusion 17*g*, which is engaged with the protrusion 3*f* at the low-speed rotation of the engine, is protruded on the periphery of the rotary valve 17 and formed by extending in the axial direction. The both opposite surfaces of the protrusion 3*f* and the second protrusion 17*g* are to be plane-shape, or at least a rubber seal 24 for use in sealing is attached to one opposite surface like the opposite surface of the second protrusion 17*g*.

The rubber seal 24 extends in the axial direction of the rotary valve 17. At the low-speed rotation, the rubber seal 24 touches on the opposite surface of the protrusion 3*f* inside the inner pipe 3 so as to prevent the air of the surge tank 5 from leaking into the second manifold inlet 3*e*.

Accordingly, a drop in engine torque is prevented at the low-speed rotation.

Further in this embodiment 4, a connecting hole 17*f* of the rotary valve 17 is a shaped connecting hole by adding the angle of circumference(or length) of the connecting holes 17*d* and 17*e* of the third embodiment as shown in FIG. 8.

In other words, the second manifold inlet 3*e* is closed by the rotary valve 17 at the low-speed rotation so that there is no direct path to the surge tank 5. On the other hand, at the high-speed rotation, the connecting hole 17*f* of the rotary valve 17 is provided so that the second manifold inlet 3*e* can be connected with the surge tank 5 by the rotary valve 17.

The material of the seal 24 need not be limited to rubber and the seal material can be selected according to the extent of sealing required. The seal material may consist of elastic deformable resin, or both protrusions can be directly attached without any seal materials.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An intake manifold comprising:

an outer pipe, an inner pipe fit-inserted into said outer pipe and having a surge tank inside;

a plurality of rim-shaped passage walls spaced at intervals in an axial direction along a periphery of said inner pipe;

a plurality of spiral manifold passages being defined between each rim-shaped passage wall, said outer pipe and said inner pipe;

a plurality of manifold inlets formed at intervals in the axial direction through a wall surface of said inner pipe for delivering air from said surge tank into the manifold passages; and a plurality of manifold outlets formed at intervals in the axial direction of an inner wall surface of said outer pipe for supplying the air from each of said manifold passages to each intake port of a multi-cylinder engine;

wherein said outer pine and inner pipe are separately molded by synthetic resin;

wherein said inner pipe includes said rim-shaped passage walls which are integrated by the synthetic resin on a tubular part of said inner pipe;

wherein the diameter of said outer pipe gradually enlarges in the axial direction and the outer diameters of the rim-shaped passage walls provided along the periphery of said inner pipe gradually increase in proportion to the diameter of said outer pipe; and wherein a slot is formed on at least one of a radially outer end of a rim-shaped passage wall and an adjacent portion of the internal wall surface of said outer pipe; and a protrusion is formed on the other of said radially outer end and adjacent portion, with said protrusion being inserted by means of snap action into said slot, thereby positioning said outer pipe and inner pipe in the axial direction.

2. An intake manifold according to claim 1, wherein engagement of said slot and protrusion positions said outer pipe and inner pipe in a circumferential direction.

3. An intake manifold comprising:

an outer pipe, an inner pipe fit-inserted into said outer pipe and having a surge tank inside;

a plurality of rim-shaped passage walls spaced at intervals in an axial direction along a periphery of said inner pipe;

a plurality of spiral manifold passages being defined between each rim-shaped passage wall, said outer pipe and said inner pipe;

a plurality of manifold inlets formed at intervals in the axial direction through a wall surface of said inner pipe for delivering air from said surge tank into the manifold passages; and a plurality of manifold outlets formed at intervals in the axial direction of an inner wall surface of said outer pipe for supplying the air from each of said manifold passages to each intake port of a multi-cylinder engine;

wherein said outer pipe and inner pipe are separately molded by synthetic resin;

wherein said inner pipe includes said rim-shaped passage walls which are integrated by the synthetic resin on a tubular part of said inner pipe;

wherein the diameter of said outer pipe gradually enlarges in the axial direction and the outer diameters of the rim-shaped passage walls provided along the periphery of said inner pipe gradually increase in proportion to the diameter of said outer pipe; and wherein forked branch walls are formed at the outer diameters of said rim-shaped passage walls.

4. An intake manifold comprising:

an outer pipe, an inner pipe fit-inserted into said outer pipe and having a surge tank inside;

a plurality of rim-shaped passage walls spaced at intervals in an axial direction along a periphery of said inner pipe;

a plurality of spiral manifold passages being defined between each rim-shaped passage wall, said outer pipe and said inner pipe;

a plurality of manifold inlets formed at intervals in the axial direction through a wall surface of said inner pipe for delivering air from said surge tank into the manifold passages; and a plurality of manifold outlets formed at intervals in the axial direction of an inner wall surface of said outer pipe for supplying the air from each of said manifold passages to each intake port of a multi-cylinder engine;

wherein said outer pipe and inner pipe are separately molded by synthetic resin;

wherein said inner pipe includes said rim-shaped passage walls which are integrated by the synthetic resin on a tubular part of said inner pipe; and wherein forked branch walls are formed at the outer diameters of said rim-shaped passage walls.

5. An intake manifold comprising:

an outer pipe, an inner pipe fit-inserted into said outer pipe and having a surge tank inside;

a plurality of rim-shaped passage walls spaced at intervals in an axial direction along a periphery of said inner pipe;

a plurality of spiral manifold passages being defined between each rim-shaped passage wall, said outer pipe and said inner pipe;

a plurality of manifold inlets formed at intervals in the axial direction through a wall surface of said inner pipe for delivering air from said surge tank into the manifold passages; and a plurality of manifold outlets formed at intervals in the axial direction of an inner wall surface of said outer pipe for supplying the air from each of said manifold passages to each intake port of a multi-cylinder engine;

wherein said outer pipe and inner pipe are separately molded by synthetic resin;

wherein a slot is formed on one of the internal wall surface of said outer pipe and a peripheral surface of said inner pipe; and a protrusion is formed on the other of said internal wall surface and said peripheral surface for being inserted into the slot, thereby positioning said outer and inner pipe in circumferential direction.

6. An intake manifold comprising:

an outer pipe;

an inner pipe fit-inserted into said outer pipe and having a surge tank inside;

a plurality of rim-shaped passage walls spaced at intervals in an axial direction along a periphery of said inner pipe;

a plurality of spiral manifold passages being defined between each rim-shaped passage wall, said outer pipe and said inner pipe;

a plurality of first manifold inlets formed at intervals in the axial direction through a wall surface of said inner pipe for delivering air from said surge tank into said manifold passages;

a plurality of second manifold inlets formed at intervals in the axial direction through an inner circumferential wall surface of said inner pipe for letting air from said surge tank into each of said manifold passages and being positioned farther downstream in the air flow through the manifold passages than said first manifold inlets;

a plurality of manifold outlets formed at intervals in the axial direction of a wall surface of said outer pipe for supplying the air from each of said manifold passages to each of intake ports of a multicylinder engine; and a rotary valve rotatable supported within the inner circumferential wall surface of said inner pipe, said rotary valve comprising:

a first connecting hole for leading the air inside said surge tank into a first manifold passage through a first manifold inlet at a low-speed rotation; and a second connecting hole for leading the air inside said surge tank into said first manifold passage through a second manifold inlet; and said intake manifold further comprising sealing means provided with a gap between said inner pipe and said rotary valve for partitioning a supply of air from said first manifold inlet and a supply of air from said second manifold inlet.

7. An intake manifold according to claim 6, wherein said sealing means includes a first radial protrusion extending in the axial direction from either said inner pipe or said rotary valve, and a second radial protrusion extending in the axial direction from the other of said inner pipe or said rotary valve with means for resiliently contacting said first radial protrusion.

8. An intake manifold comprising:

an outer pipe having a cylindrical tubular part and a plurality of manifold outlets provided in parallel at intervals in an axial direction of said tubular part;

an inner pipe having a tubular part provided inside said outer pipe, and a plurality of rim-shaped passage walls formed in parallel at intervals in the axial direction on a periphery of said tubular part;

a manifold passage formed at each space which is defined between each passage wall and an inner periphery of the outer pipe so as to connect with each of said manifold outlets when said inner pipe is inserted into said outer pipe;

a cutoff wall provided on a periphery of said inner pipe for connecting with an upper internal wall surface of each of said manifold outlets; and a first manifold inlet, which is close to said cutoff wall and provided through said inner pipe tubular part on an upstream side of said manifold outlet, for connecting with each manifold passage;

a cylindrical rotary valve inside the inner pipe for rotating in accordance with engine operating conditions;

a second manifold inlet provided between said cutoff wall of the tubular part of the inner pipe and said first manifold inlet; and an air intake passage for connecting with the second manifold inlet through the rotary valve at a high-speed engine operation a combination of fitted parts for positioning the inner pipe relative to the outer pipe in an axial direction, said combination of fitted parts including a first fitted part formed on an outer periphery of a passage wall of the inner pipe, and a second fitted part formed on the inner periphery of the outer pipe, said combination of fitted parts also sealing both of the inner pipe and the outer pipe; and another fitted part for positioning the inner pipe relative to the outer pipe in a circumferential direction.

9. An intake manifold comprising:

an outer pipe having a cylindrical tubular part and a plurality of manifold outlets provided in parallel at intervals in an axial direction of said tubular part;

an inner pipe having a tubular part provided inside said outer pipe, and a plurality of rim-shaped passage walls formed in parallel at intervals in the axial direction on a periphery of said tubular part;

a manifold passage formed at each space which is defined between each passage wall and an inner periphery of the outer pipe so as to connect with each of said manifold outlets when said inner pipe is inserted into said outer pipe;

a cutoff wall provided on a periphery of said inner pipe for connecting with an upper internal wall surface of each of said manifold outlets; and a first manifold inlet, which is close to said cutoff wall and provided through said inner pipe tubular part on an upstream side of said manifold outlet, for connecting with each manifold passage;

a combination of fitted parts for positioning the inner pipe relative to the outer pipe in an axial direction, said combination of fitted parts including a first fitted part formed on an outer periphery of a passage wall of the inner pipe, and a second fitted part formed on the inner periphery of the outer pipe, said combination of fitted parts also sealing both of the inner pipe and the outer pipe; and another fitted part for positioning the inner pipe relative to the outer pipe in a circumferential direction.

10. An intake control unit comprising:

a plurality of manifold passages equal in number to a number of engine cylinders, said manifold passages being provided around the outside of a tubular part of inner pipe;

a first manifold inlet and a second manifold inlet being provided through the inner pipe into each of said manifold passages;

a rotary valve being inserted into the pipe for selectively connecting each of said first and second manifold inlets with said manifold passage by rotation of said rotary valve; and a radially outward protrusion from the outer periphery of said rotary valve selectively contacting a radially inward protrusion form the inner circumference of the tubular part of the inner pipe for sealing a gap between the outer periphery and the inner circumference at a short distance from said first manifold inlet and said second manifold inlet through the inner pipe.

11. A method for forming an intake manifold for a multi-cylinder engine, said method comprising the steps of:

molding an inner pipe from synthetic resin with said inner pipe having a plurality of axially spaced passage walls extending radially outward from an outer periphery of said inner pipe and a surge tank being defined within an inner diameter of said inner pipe;

molding an outer pipe of synthetic resin; and inserting said inner pipe into said outer pipe and joining outer edges of said passage walls with an inner periphery of said outer pipe to form a plurality of manifold outlets between said passage walls and said outer pipe for supplying air to each intake port of a multi-cylinder engine.

* * * * *